Nov. 22, 1927.

A. I. SYLVESTER 1,649,873

MOTOR SLED

Filed Jan. 11, 1927

INVENTOR.
ALEXANDER I. SYLVESTER.
BY
Smith and Michael
ATTORNEYS.

Patented Nov. 22, 1927.

1,649,873

UNITED STATES PATENT OFFICE.

ALEXANDER I. SYLVESTER, OF BALTIMORE, MARYLAND.

MOTOR SLED.

Application filed January 11, 1927. Serial No. 160,458.

My invention relates to sleds and has particular reference to a motor sled primarily designed to travel on snow or ice, but capable of slight modification to enable the vehicle to travel over surfaces not covered with snow or ice.

An object of my invention is to provide a vehicle having runners adapted to operate on snow or ice surfaces and provided with means whereby auxiliary wheels may be readily attached to the vehicle to raise the runners out of contact with the surface and to support the vehicle, whereby the same may be operated as an ordinary wheeled vehicle.

A further object of my invention is to provide a novel form of steering mechanism for the vehicle which is adapted to accomplish steering of the vehicle when operating on its runners and also to function to steer the vehicle when the auxiliary wheels have been attached to convert the vehicle into an ordinary wheeled vehicle.

A further object of my invention is to provide a steering device adapted to swing the forward, pivotally mounted sections of the runners to the right or left to accomplish steering of the vehicle when operating on its runners, and to operatively connect this steering mechanism with an auxiliary steering mechanism adapted to carry auxiliary wheels, whereby the movement of the runner steering mechanism is transmitted to the auxiliary steering mechanism and steering thus accomplished when the vehicle is converted into an ordinary wheeled vehicle.

A still further object of my invention is to provide a steering device of the above mentioned character which is simple in construction, reliable in operation, and highly efficient in the purpose for which designed.

In the accompanying drawings forming a part of this specification, and in which like numerals are employed to designate like parts throughout the several views:—

Figure 1:
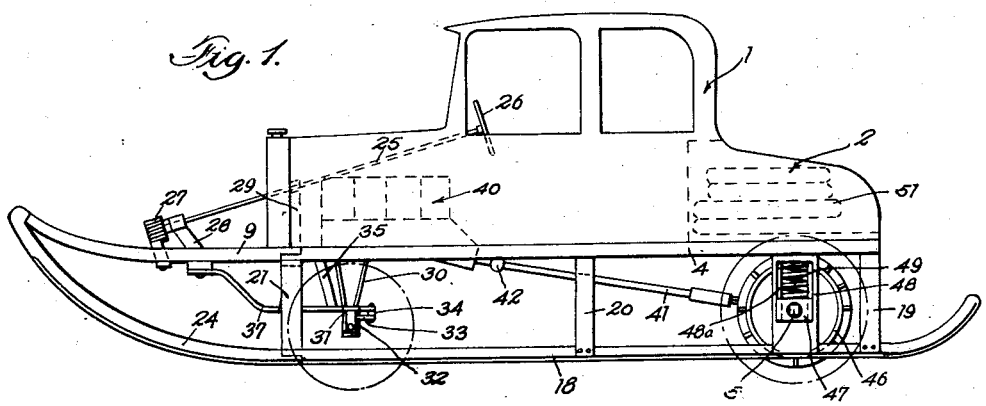
Figure 2:
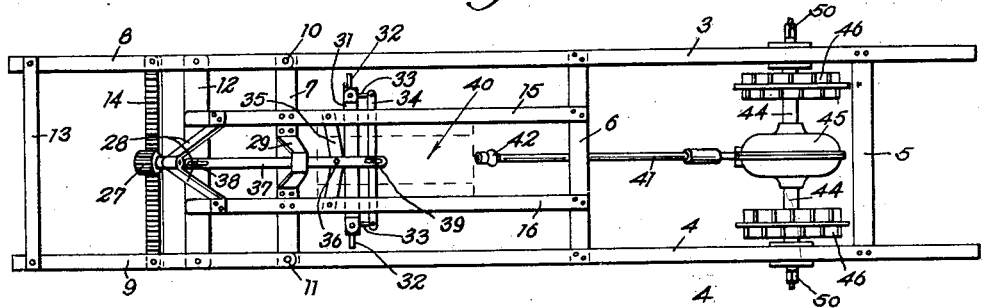
Figure 3:
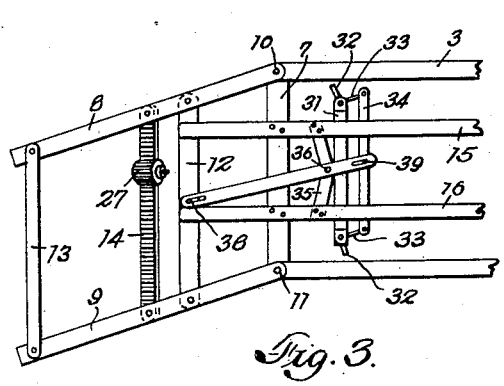
Figure 4:
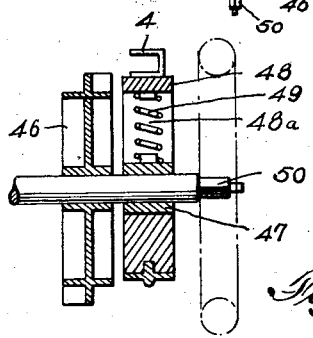

Fig. 1 is a side elevation of my improved vehicle showing the construction when the vehicle is operating on the runners as a motor sled, Fig. 2 is a plan view of the chassis frame and steering mechanism, the body of the vehicle being removed for the purpose of illustration, Fig. 3 is a fragmental view of the runners showing the runner steering mechanism and the auxiliary steering mechanism in position to accomplish a left hand turn of the vehicle, and Fig. 4 is an enlarged sectional view on the line 4—4 of Fig. 1, showing the rear axle mounted and an auxiliary wheel attached to convert the vehicle into a wheeled vehicle.

Referring to the drawings, wherein is shown a preferred embodiment of my invention, the numeral 1 designates broadly the body of the vehicle, the same being shown as a coupé type of "closed" body, although it is to be understood that the body may be of any preferred type or style either "closed" or "open" and may be either of the passenger or truck type. At a suitable location within the body structure, I provide a storage compartment 2 for a purpose to be hereinafter described. The body 1 is rigidly attached to a pair of main frame members 3 and 4 connected by transverse beams 5, 6 and 7, said side frames and transverse beams forming in reality the chassis frame of the vehicle. Pivotally mounted at the forward ends of the side frames 3 and 4 are forwardly extending members 8 and 9 which are free to swing to the right or left about fixed pivot pins 10 and 11 mounted in the forward end of the side frame members 3 and 4. The forward extensions 8 and 9 are connected by transverse brace beams 12 and 13 having their ends pivotally connected to said extensions and being free to move about these pivot points to permit side swing or movement of the said extensions 8 and 9. A transverse rack member 14 also extends between the extensions 8 and 9 and has its ends pivotally connected to said extensions, the said rack member having on its upper surface suitably pitched teeth which assist in the steering of the vehicle in a manner to be hereinafter described. Longitudinal beams 15 and 16 disposed parallel to the side frames 3 and 4, are rigidly secured to the transverse beams 6 and 7 by suitable bolts or rivets, and have their forward ends resting on the transverse beam 12 but are not attached thereto.

The ground-engaging runners of my improved vehicle comprise a pair of spaced parallel runner members 17 and 18 positioned directly beneath the main side frame members 3 and 4 and attached in parallel spaced relation to said members 3 and 4 by means of the vertically extending side members 19, 20 and 21. The rear ends of these runner members 17 and 18 are preferably curved upwardly as shown in Fig. 1 and have a central, longitudinally extending bead or rib 22 adapted to prevent side skidding of the vehicle when travelling on said runners. At the forward end of the runner members 17 and 18, I provide forwardly extending runner members 23 and 24, said runner members curving upwardly and having their forward ends rigidly secured to the forward ends of the members 8 and 9. The rear ends of the runner members 23 and 24 are pivotally connected to the runner members 17 and 18 at points directly below the pivot pins 10 and 11, it being understood that the forward section comprising the members 8, 9, 12, 13, 14, 23 and 24, is adapted to swing to the right or left about its pivotal mountings relative to the main section comprising the members 3, 4, 17 and 18 and the transverse and vertical beams or braces associated therewith.

The steering of the vehicle when operating on its runners is effected by causing the front sections of the runners to swing to the right or left depending upon the desired direction of travel, this swinging movement of the said sections being accomplished by means of a steering shaft 25, at the upper end of which is mounted a steering wheel 26, and at the lower end of which is mounted a worm or pinion 27 meshing with the rack 14 extending transversely between the members 8 and 9. The steering shaft 25 is journalled in brackets 28 and 29, rigidly secured to the beams 15 and 16.

A pair of brackets 30 depend from the beams 15 and 16 and support at their lower ends an axle 31, the ends of which are forked. Within the forked portion at the ends of said axle are pivotally mounted stub axles having the usual outwardly extending wheel-supporting axles 32 and the rearwardly extending operating arms 33 connected by a tie-rod 34. A transversely extending bracket 35 depends from the spaced beams 15 and 16 and has at its central portion a pivot pin 36 for an operating rod 37, the ends of said rod being slotted and engaging pins 38 and 39 carried respectively by the transverse beam 12 and the tie-rod 34. It is therefore apparent from this detailed description of construction that movement of the front runner section to the right or left about its pivotal mounting, effected by the rotation of the steering shaft 25 acting through the rack 14 and pinion 27, will be transmitted through the operating rod 37 to the tie-rod 34 which will cause the stub axles 32 to move in unison with the front runner sections. It is to be noted that the formation and pitch of the teeth on the rack 14 and worm or pinion 27 is such as to permit rotation of the pinion 27 and also to permit said rack 14 to move axially of the pinion 27 during turning movements of the front runner section. The slot-and-pin connection between the ends of the operating rod 37 and the beam 12 and the tie-rod 34 permits of the transverse movement of the beam 12 and tie-rod 34 during turning movements.

The preferred means of driving the vehicle, consists of a suitable internal combustion engine 40 supported on the beams 15 and 16 and acting through suitable clutch and transmission mechanism to impart rotation to a drive shaft 41 having on its forward end a universal joint connection 42. The rear end of the drive shaft 41 is squared and fits into a correspondingly squared bore in a connecting block or coupling 43 connected to the rear axle 44 of the vehicle through a differential 45. Mounted on the rear axle 44 at opposite sides of the differential 45 is a pair of traction wheels 46, provided on their peripheries with suitable lugs or other anti-slipping members to insure proper traction. The rear axle 44 is journalled in vertically slidable blocks 47 adapted to reciprocate within open rectangular frames 48 secured at each side of the vehicle between the side beams 3 and 4 and the ground engaging runners 17 and 18. The inner surfaces of the vertically extending front and rear members of the frame 48 are provided with inwardly extending beads or ribs 48ᵃ which coact with grooves in the front and rear sides of the slidable blocks 47 to thus guide and confine said blocks in their vertical movement. Positioned within the rectangular frames 48 above the blocks 47 are coil springs 49 which tend to force the axle and traction wheels downwardly into contact with the ice and snow to thus insure proper driving contact. The ends of the rear axle 44 are provided with squared portions 50.

A set of four auxiliary wheels 51 is provided, two of said wheels being for attachment to the stub-axles 32 and two for attachment to the rear axle ends 50, when it is desired to convert the sled into a wheeled vehicle. The front auxiliary wheels adapted for attachment to the stub axles 32 are somewhat smaller in diameter than the rear auxiliary wheels adapted for attachment to the rear axle ends 50, it being understood that the diameter of all wheels is such that, when the wheels are attached, the wheels project below the runners and the vehicle is then supported on said wheels and is driven and steered thereby. The front wheels have round hubs adapted to fit over the stub axle sections 32 and to rotate thereon, whereas the rear wheels have squared hubs adapted to fit over the squared ends 50 of the axle 44 whereby rotation of the axle is transmitted to the rear wheels and the vehicle propelled thereby. When the auxiliary wheels are not in use, i. e., when the vehicle is operating on its runners as a motor sled, they may be conveniently stored in the compartment 2 of the vehicle body 1.

Referring to the operation of the vehicle the construction of which has above been described, it will be seen that I have provided a motor sled adapted to be propelled and steered over ice and snow, the driving of said sled being preferably effected by a pair of spaced traction wheels 46 forced downwardly into intimate contact with the snow or ice by springs which keep the traction wheels in driving engagement with the snow or ice surface regardless of irregularities in the surface being travelled. The steering of the vehicle when riding on its runners is effected by pivotally mounting a forward portion of the runners whereby they may swing to the right or left, this swinging movement being effected by means of a suitable steering shaft and hand wheel. When it is desired to convert the motor sled into an ordinary wheeled vehicle it is only necessary to jack up the vehicle; to remove the auxiliary wheels from their storage compartment; attach the front wheel to the stub axles 32; and the rear wheels to the rear axle ends 50. When so converted, the rear wheels propel the vehicle, and the front wheels, due to the interconnection between the runner steering mechanism and the auxiliary steering mechanism, effect the steering of the wheeled vehicle.

It is to be understood that the form of my invention herein shown and described is to be taken as a preferred embodiment of the same and that various changes in the size, shape and arrangement of parts may be resorted to without departing from the scope of my invention or the scope of the subjoined claims.

Having thus described my invention, what I claim as new is:—

1. A motor sled adapted to normally travel over snow or ice surfaces and comprising a pair of side runners each consisting of a rear section and a front section pivotally connected to the rear section for relative turning movement, means for causing the front section to move to the right or left about its pivots to effect steering of the sled, a transverse beam pivotally connected to the side members of said front section, an auxiliary steering mechanism adapted to support auxiliary steering wheels when it is desired to convert the sled into a wheeled vehicle, and an operating rod connected to said transverse beam and to the auxiliary steering mechanism whereby movement of the said pivoted front section is transmitted to the said auxiliary steering wheels.

2. A motor sled adapted to normally travel over snow and ice surfaces and comprising a pair of side runners each consisting of a rear section and a front section pivotally connected to the rear section for relative turning movement, means for causing the front section to move to the right or left about its pivots to effect steering of the sled, a transverse beam pivotally connected to the side members of said pivoted front section, an auxiliary axle mounted between the side members of the rear section, stub axles mounted in the ends of said auxiliary axle adapted to support auxiliary wheels when it is desired to convert the sled into a wheeled vehicle, a tie-rod connecting said stub axles, and a pivoted operating rod connected to the said transverse beam and to said tie-rod whereby movement of the pivoted front section to steer to the right or left accomplishes a corresponding movement by the said stub axles.

3. A motor sled adapted to normally travel over snow or ice surfaces and comprising a pair of side runners each consisting of a rear section and a front section pivotally connected to the rear section for relative turning movement, a transversely extending rack member pivotally connected to the side runners of the front section, an operating pinion engaging said rack and adapted to cause the front section to swing to the right or left relative to the rear section whereby to effect the steering of the sled, an auxiliary axle mounted on the rear section and having stub axles pivotally mounted in the ends thereof, said stub axles adapted to receive auxiliary steering wheels when it is desired to convert the sled into a wheeled vehicle, a tie-rod connecting said stub axles for simultaneous movement, and an operating rod pivotally mounted on the rear section and connecting the front section and tie-rod, whereby movement of the pivoted front section to steer to the right or left will be transmitted through said operating rod to the said tie-rod to effect a corresponding movement of the said stub axles.

4. A motor sled adapted to normally travel over snow or ice surfaces and comprising a pair of side runners each consisting of a rear section and a front section pivotally connected to the rear section for relative turning movement, a transversely extending rack member pivotally connected to the side runners of the front section, an operating pinion engaging said rack and adapted to cause the front section to swing to the right or left relative to the rear section whereby to effect the steering of the vehicle, a transverse beam pivotally connected to the side members of said pivoted front section, a transverse beam secured to the front ends of said rear section, an auxiliary axle mounted on the rear section behind the transverse beam of the rear section and having stub axles pivotally mounted in its ends adapted to support auxiliary steering wheels when it is desired to convert the sled into a wheeled vehicle, a tie-rod connecting said stub axles to effect their simultaneous movement, and an operating rod pivotally mounted on the transverse beam of the rear section and connecting the transverse beam of the front section to the tie-rod whereby movement of the front section to steer to the right or left effects a corresponding movement of the stub axles.

In testimony whereof I hereunto affix my signature.

ALEXANDER I. SYLVESTER.